Patented Sept. 28, 1937

2,094,331

UNITED STATES PATENT OFFICE 2,094,331

COUMARONE BASE

Joseph Rivkin, Pittsburgh, Pa., assignor to The Neville Company, a corporation of Pennsylvania No Drawing. Application July 9, 1936, Serial No. 89,769

7 Claims. (Cl. 134—26)

This invention relates to a modified coumarone resin made up with China-wood oil as a gas-proof varnish base.

It has been well known in the varnish industry that a wholly satisfactory varnish may not be made up of China-wood oil and coumarone resin, the coumarone resin constituting the entire resin content of the varnish. This is for the reason that coumarone resin being neutral, and having amongst its advantageous qualities the resistance to dilute acids and to alkalies attendant upon its neutrality, as a disadvantageous quality forms with China-wood oil a varnish base which when spread as, or incorporated in, a film gas-checks badly. For this reason it has been necessary when using coumarone resin with China-wood oil to add, for the purpose of avoiding gas-checking, materials wholly different from coumarone resin, such as a high acid number resin, of which rosin is the typical example, or lead compounds and other non-resinous materials.

The inclusion of rosin in a substantial proportion results in a loss of inertness and neutrality in a varnish film comprising the vehicle, and may be considered generally as a deleterious ingredient of a varnish. The gas-checking of a coumarone and China-wood film is, however, of so serious a nature that coumarone resin is not used in association with China-wood oil in a varnish vehicle unless there is also included a resin of high acid number, such as rosin, or some non-resinous inhibitor.

I have discovered that a coumarone resin, in which the coumarone is modified during the polymerization process by which it is produced with a phenolic reagent, such as cresol, phenol, xylenol, or the like, in order to render it alcohol soluble, is additionally capable of forming with China-wood oil a varnish base which in a film is not susceptible to gas-checking. This discovery is surprising for the reason that the coumarone resin so modified has still a low acid number. Because of the low acid number of the modified coumarone, the resin still so approximates neutrality that a film formed by a varnish, the base of which consists of this modified coumarone and China-wood oil, has good alkali resistance and other good qualities. The phenolic modification of the coumarone resin, however, in spite of the relatively low acid number imparted by the modification, serves, as above noted, to prevent gas-checking in a deposited film containing the modified coumarone and China-wood oil.

The phenol-modified coumarone resin, which possesses this unexpected conjunction of qualities in association with China-wood oil, is formed by including and reacting a phenolic substance, such as cresol, phenol, or other phenolic reagent capable of reacting with the polymerizable constituents of crude solvent naphtha, with crude solvent naphtha and promoting simultaneously polymerization in the constituents of the naphtha and reaction of them with the phenolic reagent. Thus a suitably reactive phenolic substance, such as cresol, phenol, alpha-naphthol, and the like, may be caused to react with coumarone, indene, dicyclopentadiene, and the like contained in crude solvent naphtha to produce as a product of polymerization and phenol reaction a coumarone resin formed of polymers of the naphtha-contained constituents reacted with the phenol.

The procedure involved in producing such a phenol modified coumarone resin may be as disclosed in German patent to Ruetgerswerke No. 302,543 of 1917, or in accordance with the procedure disclosed in either of my co-pending applications Serial No. 53,514, filed December 9, 1935, or Serial No. 55,613, filed December 21, 1935.

In accordance with the procedure of my last-named application Serial No. 55,613, which follows the principles disclosed in German Patent No. 302,543, crude solvent naphtha and a phenol are commingled, in such proportion that the phenol is included in a quantity by weight not less than 22% the weight of the polymerizables of the crude solvent naphtha. By means of a small quantity of sulphuric acid, or suitable derivative of sulphuric acid, both the reaction of polymerization and reaction between the polymerizable bodies and the phenol is promoted. During the progress of reaction, the temperature of the reaction mixture is maintained below 60° C., and desirably within the range of 25° C. to 35° C.

In accordance with the procedure of my co-pending application Serial No. 53,514, a phenol-modified coumarone resin is produced by commingling crude solvent naphtha containing polymerizable bodies, such as coumarone, indene, and dicyclopentadiene, with a phenolic substance, such as cresol, phenol, or the like, reactive with them, and by means of agitation with activated clay in substantial quantity and with use of moderately elevated temperature in the neighborhood of 100° C. both polymerizing reaction and reaction between the polymerizables and the phenol is promoted.

It may be noted that in general the product of my last-named application has a higher acid number than that of the phenol modified coumarone resin in which a sulphuric acid base catalyst is utilized to promote the reactions. By practicing either of these methods, I am able to obtain a phenol-modified resin, which by solvent classification may be so phenol-modified as to have an acid number of 10, or even higher. For association with China-wood oil, however, it is not necessary that the coumarone be so phenol-modified as to have so high an acid number.

In making a varnish base of the phenol-modified coumarone resin and China-wood oil, these ingredients may be included in any of the relative proportions of resin to China-wood oil commonly employed in the preparation of varnish containing China-wood oil and resin. Thus the modified coumarone may be used in a short wood oil varnish containing 100 pounds of resin to 10 gallons of China-wood oil, or in a long wood oil varnish containing 100 pounds to 50 gallons of China-wood oil, to produce in both instances a varnish which forms a film proof against gas-checking. The varnish may be prepared in accordance with the well known standard procedure in making China-wood oil varnishes. After cooking in the usual manner, the varnish base is commingled with evaporative solvents, driers, and other varnish ingredients in accordance with known formulae for China-wood oil varnishes.

In order to prevent the phenomenon of gas-checking, I have found that the modified coumarone need have an acid number no higher than 5, and that it may in fact have an acid number as low as 2 to 2½ without rendering a deposited film of the varnish base susceptible to gas-checking. Thus, if I utilize a phenol-modified coumarone resin having an acid number of 5, which is the acid number naturally attendant upon the practice of the method disclosed in my application Serial No. 53,514, this phenol-modified coumarone may be utilized as no more than half the resin content of a China-wood oil varnish base, the remaining half of the resin content being a coumarone resin resultant from straight polymerization.

In connection with the varnish base, I have discovered that the presence of the phenol-modified coumarone serves greatly to decrease skinning tendencies in the China-wood oil varnish when permitted to stand, while giving none the less a quick-drying film.

Any content of phenol-modified coumarone resin in the coumarone content of a coumarone resin and China-wood oil varnish base tends to lessen gas-checking in a varnish film comprising the base. I prefer, however, to use such content of the modified coumarone, modified in such degree, that the acid number of the total content of modified coumarone resin is between 2 and 10. If the average acid number of the total coumarone content be below 2, I have found that a tendency toward gas-checking develops, and if it be over 10 the hardness and alkali resistance of the varnish film suffers impairment.

Whereas it has been possible to produce relatively satisfactory films from a varnish base containing China-wood oil and one of the more involved and expensive synthetic resins, I have discovered that a varnish base, in which the relatively inexpensive phenol-modified coumarone resin is incorporated, is at least equally satisfactory in the quality of being proof against gas-checking, and is more satisfactory than those bases containing more expensive resins and China-wood oil in the quality of alkali resistance.

It is to be understood that either phenol-modified coumarone alone, or a mixture of straight coumarone resin and phenol-modified coumarone resin, may be used in conjunction with other resins in a China-wood oil base. If the other resin be rosin, or the like resin, its inclusion is deleterious to the extent that it is included. If it be a resin of the more desirable sort, compatible with the phenol-modified coumarone and not detrimental to alkali resistance and hardness of the varnish film, the mixture of both with the China-wood oil may be employed with satisfactory results. The coumarone resin substantially phenol-modified is, however, so economical in cost and so satisfactory in association with China-wood oil, that it desirably is made the entire resin content of a resin and China-wood oil varnish base.

I claim as my invention:

1. A varnish base comprising China-wood oil and alcohol-soluble phenol-interacted coumarone resin of low acid number, said resin being present in an amount such as to inhibit gas-checking during drying of a varnish film comprising said base.

2. A varnish base comprising China-wood oil and alcohol-soluble coumarone resin formed by polymerization in the presence of a phenol, resin having a low acid number and being present in an amount such as to inhibit gas-checking during drying of a varnish film comprising said base.

3. A varnish base comprising China-wood oil, coumarone resin, and alcohol-soluble phenol-interacted coumarone resin of low acid number, the proportion of said phenol-interacted coumarone resin being such as to inhibit gas-checking during drying of a varnish film comprising said base.

4. A varnish base according to claim 1, said resin having an acid number between about 2 and 10.

5. A varnish base according to claim 3, the average acid number of the coumarone resin content being between 2 and 10.

6. A varnish base comprising a cooked product of China-wood oil and alcohol-soluble phenol-interacted coumarone resin of low acid number, said resin being present in an amount such as to inhibit gas-checking during drying of a varnish film comprising said base.

7. A varnish base comprising a cooked product of China-wood oil, coumarone resin, and an alcohol-soluble phenol-interacted coumarone resin of low acid number, the proportion of said phenol-interacted resin being such as to inhibit gas-checking during drying of a varnish film comprising said base.

JOSEPH RIVKIN.